US012112135B2

(12) United States Patent
Yuan et al.

(10) Patent No.: US 12,112,135 B2
(45) Date of Patent: Oct. 8, 2024

(54) QUESTION ANSWERING INFORMATION COMPLETION USING MACHINE READING COMPREHENSION-BASED PROCESS

(71) Applicant: INTERNATIONAL BUSINESS MACHINES CORPORATION, Armonk, NY (US)

(72) Inventors: Zhong Fang Yuan, Xian (CN); Tong Liu, Xian (CN); Chen Gao, Xian (CN); Xiang Yu Yang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 17/449,303

(22) Filed: Sep. 29, 2021

(65) Prior Publication Data

US 2023/0095180 A1    Mar. 30, 2023

(51) Int. Cl.
*G06F 40/30*  (2020.01)
*G06F 18/214* (2023.01)
*G06N 5/04*   (2023.01)

(52) U.S. Cl.
CPC .......... *G06F 40/30* (2020.01); *G06F 18/2148* (2023.01); *G06N 5/04* (2013.01)

(58) Field of Classification Search
CPC .... G06F 40/30; G06F 18/2148; G06F 40/284; G06F 40/56; G06F 16/3329; G06N 5/04; G06N 3/096; G06N 3/045; G06N 3/092
See application file for complete search history.

(56) References Cited

U.S. PATENT DOCUMENTS

| 8,606,616 B1* | 12/2013 | Crapsey, III | G06Q 10/0637 |
| | | | 705/7.36 |
| 2002/0116174 A1* | 8/2002 | Lee | G10L 15/1822 |
| | | | 707/E17.09 |
| 2020/0184019 A1* | 6/2020 | Yu | G06N 3/084 |
| 2021/0034621 A1* | 2/2021 | Patel | G06F 16/24522 |
| 2021/0200954 A1* | 7/2021 | Dsouza | G06N 20/00 |
| 2021/0232948 A1* | 7/2021 | Otsuka | G06N 3/047 |

(Continued)

FOREIGN PATENT DOCUMENTS

| CN | 107225579 A | 10/2017 |
| CN | 110019753 A | 7/2019 |
| CN | 110866587 A | 3/2020 |

OTHER PUBLICATIONS

Luo, H., Li, S.W., Gao, M., Yu, S. and Glass, J., Mar. 22, 2021. Cooperative Self-training of Machine Reading Comprehension; arXiv preprint arXiv:2103.07449V2. (Year: 2021).*

(Continued)

*Primary Examiner* — Douglas Godbold
*Assistant Examiner* — Philip H Lam
(74) *Attorney, Agent, or Firm* — Schmeiser, Olsen & Watts, LLP; Aaron Pontikos

(57) ABSTRACT

An approach is provided for optimizing a feedback-type question answering process. A training set is constructed to detect missing information of a question. A natural language generation model is trained using the missing information. The natural language generation model is executed to generate a rhetorical question. A response to the rhetorical question is combined with the question to generate an input to a language processor. A new question is generated. The new question is applied to a document library. A final answer is generated.

20 Claims, 10 Drawing Sheets

(56) References Cited

U.S. PATENT DOCUMENTS

| | | | |
|---|---|---|---|
| 2021/0312308 A1* | 10/2021 | Chen | G06F 40/35 |
| 2021/0383074 A1* | 12/2021 | Maheswaran | G06F 40/40 |
| 2021/0406735 A1* | 12/2021 | Nahamoo | G06F 40/247 |
| 2022/0138267 A1* | 5/2022 | Otsuka | G06F 40/56 704/9 |
| 2022/0138508 A1* | 5/2022 | Huang | G06F 18/241 382/181 |
| 2022/0164549 A1* | 5/2022 | Gupta | G06F 40/56 |
| 2023/0376779 A1* | 11/2023 | Li | G06N 3/09 |

OTHER PUBLICATIONS

Chan, Y. H., & Fan, Y. C. (Nov. 2019). A recurrent BERT-based model for question generation. In Proceedings of the 2nd workshop on machine reading for question answering (pp. 154-162). (Year: 2019).*

Zhu, F., Lei, W., Wang, C., Zheng, J., Poria, S., & Chua, T. S. (2021). Retrieving and reading: A comprehensive survey on open-domain question answering. arXiv preprint arXiv:2101.00774. (Year: 2021).*

Shwartz, V., West, P., Bras, R. L., Bhagavatula, C., & Choi, Y. (2020). Unsupervised commonsense question answering with self-talk. arXiv preprint arXiv:2004.05483. (Year: 2020).*

Hu, Xiang et al.; Interactive Question Clarification in Dialogue via Reinforcement Learning; Proceedings of the 28th International Conference on Computational Linguistics: Industry Track; Dec. 12, 2020; pp. 78-89.

Korpusik, Mandy et al.; Deep Learning for Database Mapping and Asking Clarification Questions in Dialogue Systems; IEEE/ACM Transactions on Audio, Speech, and Language Processing, vol. 27, No. 8; Aug. 2019; pp. 1321-1334.

Mell, Peter et al.; "The NIST Definition of Cloud Computing;" National Institute of Standards and Technology; Special Publication 800-145; Sep. 2011; 7 pages.

Zamani, Hamed, et al.; Generating Clarifying Questions for Information Retrieval; International Word Wide Web Conference; Apr. 20-24, 2020; 11 pages.

* cited by examiner

QUESTION ANSWERING INFORMATION COMPLETION USING MACHINE READING COMPREHENSION-BASED PROCESS

BACKGROUND

Embodiments of the present invention relate generally to artificial intelligence, and in particular to a feedback-type information completion technique that provides missing information for a question answering (QA) system using machine reading comprehension technology.

In conventional machine reading comprehension QA environments, users ask open-ended questions that often lack important information, and which prevents a knowledge base from generating a viable answer. The knowledge base storing complex structured and unstructured information instead produces significant results from a search for an answer to an open-ended question, and in doing so cannot provide an accurate answer due to the missing information causing lack of clarity of the question.

SUMMARY

In one embodiment, a computer system comprises a central processing unit (CPU); a memory coupled to the CPU; and one or more computer readable storage media coupled to the CPU, the one or more computer readable storage media collectively containing instructions that are executed by the CPU via the memory to cause the processor to implement a question answering system process. The process comprises constructing, by the at least one processor, a training set to detect missing information of a question; training, by the at least one processor, a natural language generation model using the missing information; executing, by the at least one processor, the natural language generation model to generate a rhetorical question; combining, by the at least one processor, a response to the rhetorical question and the question to generate an input to a language processor; generating, by the language processor, a new question; applying the new question to a document library; and generating a final answer.

A computer program product and a method corresponding to the above-summarized computer system are also described and claimed herein.

DETAILED DESCRIPTION

In brief overview, embodiments of the present disclosure relate to a system and method that employ a rhetorical questioning technique to automatically clarify ambiguous semantics in question sentences and obtain additional comprehensive information missing in the question sentences by generating clarifying question sentences from to actively request the questioner to obtain the additional information. The rhetorical questioning technique distinguishes from conventional machine learning training models that apply trial and error techniques to learn in an interactive environment.

Figure 1:
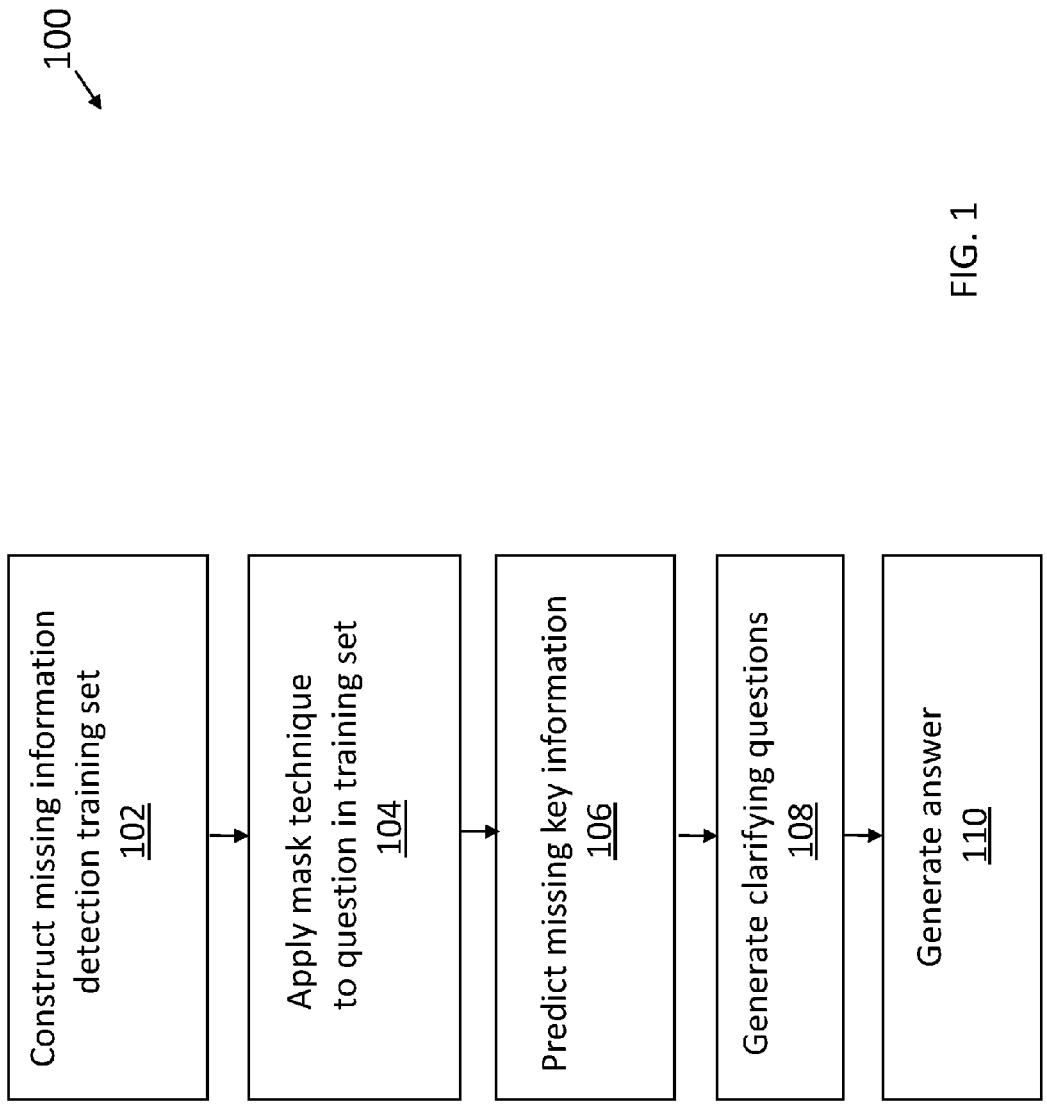
FIG. 1 illustrates a flow diagram of a method for processing a question that includes missing information, in accordance with embodiments of the present invention.

FIG. 1 illustrates a flow diagram of a method 100 for processing a question that includes missing information, in accordance with embodiments of the present invention. Each of the steps in the method 100 may be enabled and executed in any order by a hardware processor executing computer code, for example, shown and described with reference to FIG. 8. Additionally, each method step may be enabled and executed in combination by a computer memory device, for example, and described with reference to FIG. 8. In sum, in a feedback-type information completion method, a question answering dataset is processed to generate a new dataset based on reinforcement learning (RL) techniques which predicts missing information in the question of interest. Clarifying question requests can be generated to obtain the information. A QA model question can be generated from the original question modified to include the supplemental information acquired from the clarifying question requests so that accurate answer fragments can be retrieved from the stored electronic information sources such as articles and so on.

In step 102, a missing information detection training set is constructed. The training dataset is generated to address missing information in a received question by generating clarifying questions to actively ask the questioner to obtain supplementary information. In some embodiments, a Stanford Question Answering Dataset (SQuAD)-type comprehension dataset may be implemented to construct a dataset based on a RL algorithm to determine missing information. Although SQuAD is referred to by way of example, other datasets containing labeled question-answer pairings may equally apply.

At step 104, a mask method is applied to the question portion of the constructed training set of data. In particular, the mask method can cover the nouns and verbs of the question: one at a time, and apply a reading comprehension algorithm to the question with the covered or redacted noun or verb. The masked questions, each having the covered noun or verb is processed in view of the original article and other article(s) searched for and recalled in the training set to obtain articles semantically related to the original question, are processed to generate the new training data that is fed to a RL algorithm. In some embodiments, the new training data is generated by a predetermined set of rules establishing a reward score established by conditions for masking the words, so that that the new training data includes a combination of the masked word, the question, the reward, the passage, and the answer, as shown in the example illustrated in FIG. 4.

In step 106, after the training dataset is constructed, missing key information that may appear in the question is predicted. In some embodiments, a RL algorithm is executed to receive the new training data including the reward data to predict the missing key information of the question for training a machine learning model that can select words that appear in the question. These words may be missing key information that may appear in question sentences during use.

At step 108, the action model trained by reinforcement learning in step 106 is used to select keywords from the passage of interest as possible missing information in the question. One or more clarifying questions are generated from the missing information, which can be used to actively ask the questioner to provide the supplementary information. The missing information is identified by the RL system selecting keywords of interest as possible missing information in the question. A natural language generation method may be used to generating the clarifying questions.

Figure 2:
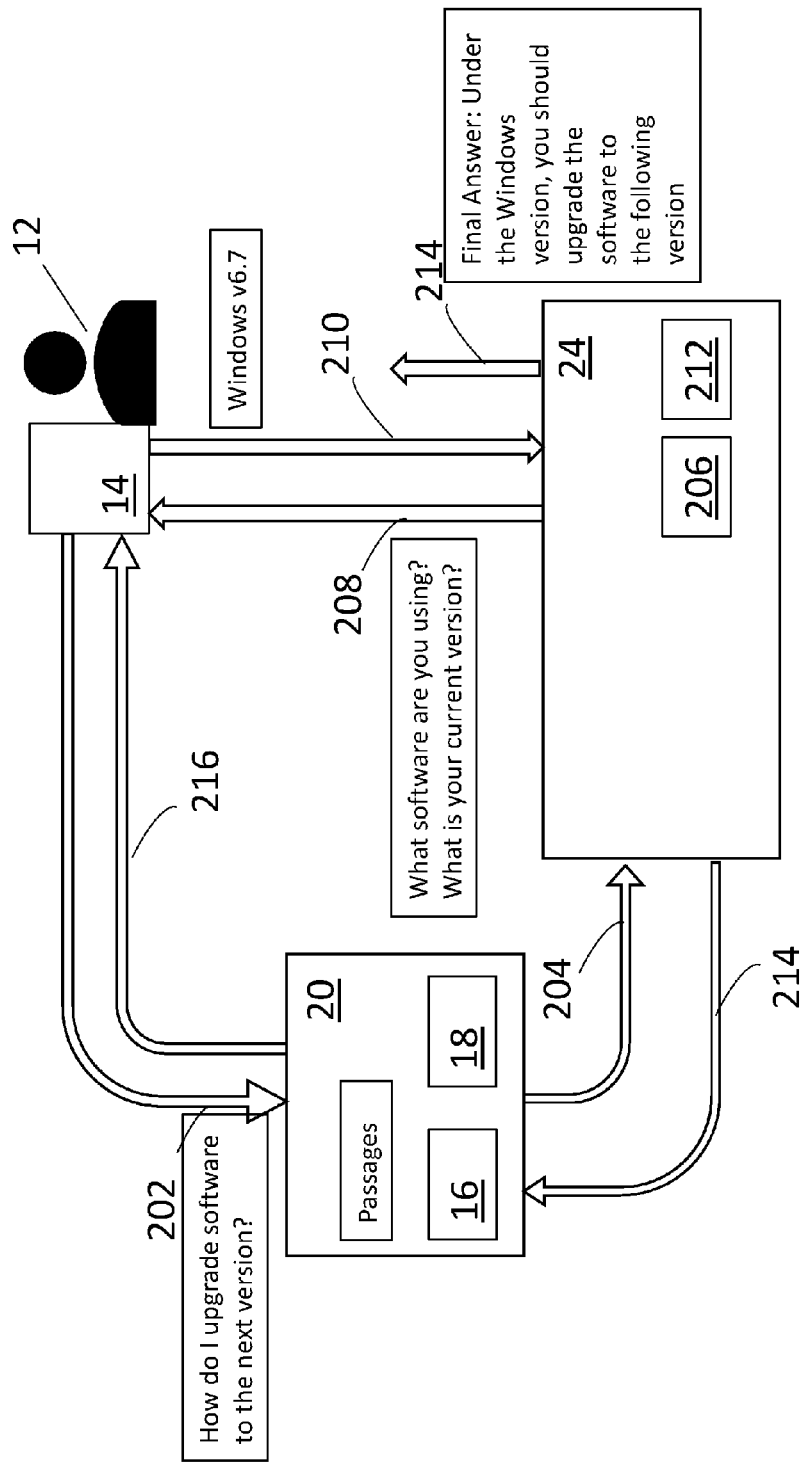
FIG. 2 illustrates a QA system in which methods for question answering are performed, in accordance with embodiments of the present invention.

At step 110, an answer is generated after the users responds to the clarifying question generating in step 108. The user's response is combined with the original question and a text style transfer algorithm and NLG algorithm are used to generate new questions, which are applied to the document library of a knowledge base, where an accurate answer is generated. The transfer algorithm can use a known transform-based technology and the NLG algorithm can use a Generative Pre-trained Transformer (GPT)-3-based model and the natural language style transfer method to generate new questions in a format and style that is compatible with the machine reading comprehension model, e.g., consistent with that of the original SQuAD dataset, which can guarantee the accuracy of the answer to the greatest extent The disclosed method 100 of FIG. 1 may be implemented within a QA system 10 as shown by way of example at FIG. 2, which includes a knowledge base 20 and a special-purpose computer server 24. Elements of the QA system 10 such as the knowledge base 20 and a special-purpose computer server 24, and/or software executing at the user computer 14, may communicate via a network such as a local area network, (LAN), a wide area network (WAN), the Internet, a wireless network, etc. The knowledge base 20 and special-purpose computer server 24 can each comprise specialized hardware comprising circuitry, for example, shown in FIG. 8, for storing and/or executing the process described herein.

The knowledge base 20 includes a document library or the like for the collection of digitally stored content in system readable form, and provided from various sources that can be output as answers to user queries. The knowledge base 20 may be stored at one or more databases 16 and is generated and/or updated by a knowledge server 18. Articles for machine training purposes may be stored at the knowledge base 20. The knowledge base 20 can include or otherwise communicate with artificial intelligence technology to interact and respond to user input.

The computer server 24 can execute one or more various reading comprehension algorithms, input algorithms, RL algorithms, natural language generation algorithms, text style transfer algorithms, and maximum likelihood estimation algorithms (described in detail below) for permitting the QA system 10 to generate an accurate answer to a question. For example, the computer server 24 executes a combination of maximum likelihood estimation and natural language generation algorithms to generate rhetorical questions for obtaining missing information in an original question, for example, according to the method 100 described above.

During operation, a user 12, also referred to as a questioner, asks an open question, or query, regarding an article or the like of the knowledge base 20 stored at the database 16. The query is received by the user computer 14, stored and processed electronically, and output (202) to the knowledge base 20. Alternatively, the query is entered directly to the knowledge base 20.

However, the query may be vague, indefinite, or otherwise lack important information that would allow the system 10 to perform a robust search for an accurate answer to the question. For example, the user may ask "how to upgrade my computer to the next version." This question lacks key information such as the type of computer the user is using, the operating system that the computer is running, the current version of software running on the computer, and so on.

A missing information detection training set is constructed (204) from the SQuAD dataset. The question is segmented, and the knowledge server 18 performs a semantic search method to search for relevant articles in the knowledge base 20, and obtains articles that are semantically related to the original question. The articles are subsequently processed by a reading comprehension algorithm for locating the answer.

The computer server 24 executes (206) a maximum likelihood estimation process to synthesize the question data and perform a comparison generation process to obtain the missing information points and organizes the missing information points into a natural language using natural language generation algorithms to generate one or more rhetorical questions containing missing information. The computer server 24 then outputs (208) the rhetorical question(s) as feedback to the user computer 14 of the user/questioner 12 for the purpose of reinforcing the original question with supplemental information missing in the original question. The user 12 enters the answer(s) to the rhetorical question(s) into the user computer 14, which in turn outputs (210) the answer(s) as supplemental information to the computer server 24.

The computer server 24 synthesizes (212) the received supplemental information and the information in the original question to modify the question and applies a combination of natural language style transfer and natural language generation technology, e.g., NLG algorithms described herein, to generate at least one final question that is compliant for receipt and processing by the QA model. In some embodiments, this includes training the NLG model based on a GPT3 model or the like. The QA model question generated at the computer server 24 is output (214) to the knowledge base 20, which acts on the document library 20 to search for matches based on the generated QA model question and generates (216) an answer for output to the user computer 14.

Figure 3:
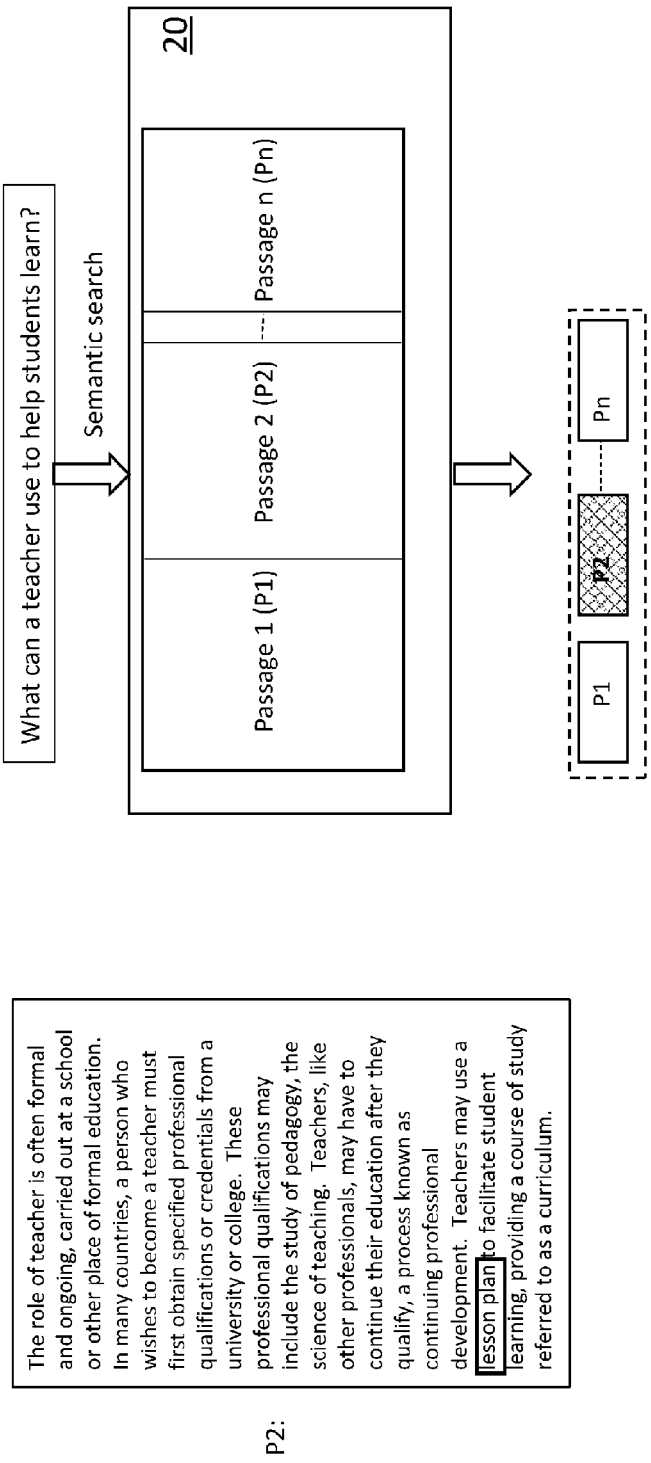
FIG. 3 depicts an example of a construction of a missing information detection training set, in accordance with embodiments of the present invention.

FIG. 3 depicts an example of a construction of a missing information detection training set, in accordance with an embodiment. This example may be performed by step 102 of FIG. 1 and/or step 204 in FIG. 2.

In some embodiments, a reading comprehension dataset such as SQuAD constructs a missing information detection training set according to a RL technique to detect missing information in a question of interest. The reading comprehension dataset can be constructed and arranged to include (1) the article or passage under question, (2) the question, and (3) the answer to the question in the passage. In segmenting the question to construct the training set, a semantic search method can be executed, for example, using a search engine or the like for generating search results, to identify other passages in the training set that are semantically related to the original question. In some embodiments, search queries may occur across different data sources. The articles may be negative samples or the like for training a machine learning model. As described herein, the answer may or may not be present in a particular passage of interest, i.e., undergoing a search. The reading comprehension dataset is output to a machine learning model to construct the new or modified training set.

In the example shown in FIG. 3, passages 1-n are related articles recalled by the system in response to the receipt and processing of the original question after a semantic search is performed. Passage 2 corresponds to the original question and contains the correct answer.

Figure 4:
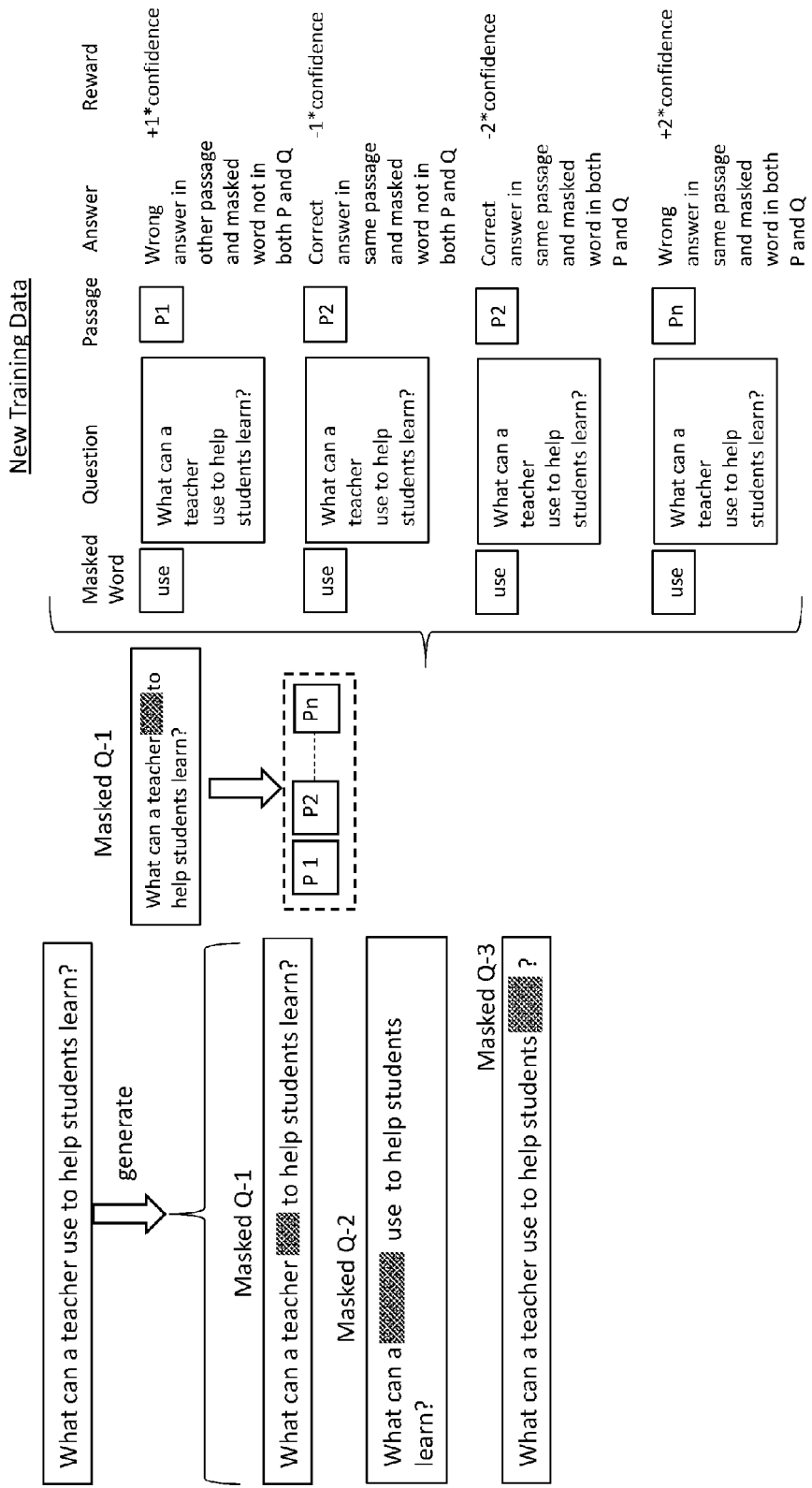
FIG. 4 depicts an example of the use of a mask method in the construction of a missing information detection training set, in accordance with an embodiment.

FIG. 4 depicts an example of the use of a mask method in the construction of a missing information detection training set, in accordance with an embodiment. This example may be performed by step 104 of FIG. 1 and/or step 204 in FIG. 2.

After constructing the missing information detection training set, the mask method is executed to cover the nouns and verbs in the question: one at a time. Accordingly, multiple masked questions can be generated, each derived from the original question. As shown in FIG. 4, each masked question is processed in view of the original passage and/or related articles recalled by the original question after a semantic search shown in FIG. 3. The covered question, the original article, and search recalled algorithm can collectively be part of a passage input algorithm processed by the QA computer 24.

In some embodiments, a set of rules for generating the training set are applied.

A first rule is that if the masked word is in both the question and the passage, and if the answer retrieved by the question after the mask is applied remains unchanged, then the reward score has a value equal to a multiplier of −2 applied to a confidence value of the reading comprehension algorithm.

A second rule is that if the masked word is only in the question, and if the answer retrieved by the question after the mask is applied remains unchanged, then the reward score has a value equal to a multiplier of −1 applied to a confidence value of the reading comprehension algorithm.

A third rule is that if the masked word is only in the question, and if the answer retrieved by the question after the mask is applied changes but is still in the original article, then the reward score has a value equal to a multiplier of +1 applied to a confidence value of the reading comprehension algorithm.

A fourth rule is that if the masked word is in both the question and the passage, and if the answer retrieved by the question after the mask changes but is no longer in the original article, then the reward score has a value equal to a multiplier of +2 applied to a confidence value of the reading comprehension algorithm.

The foregoing process is repeated for each piece of data in the SQuAD dataset to generate new training data composed of a masked word, a question, a reward, a passage, and answer. This training data is generated as a set of follow-up training data to be applied to a reinforcement learning algorithm.

Figure 5:
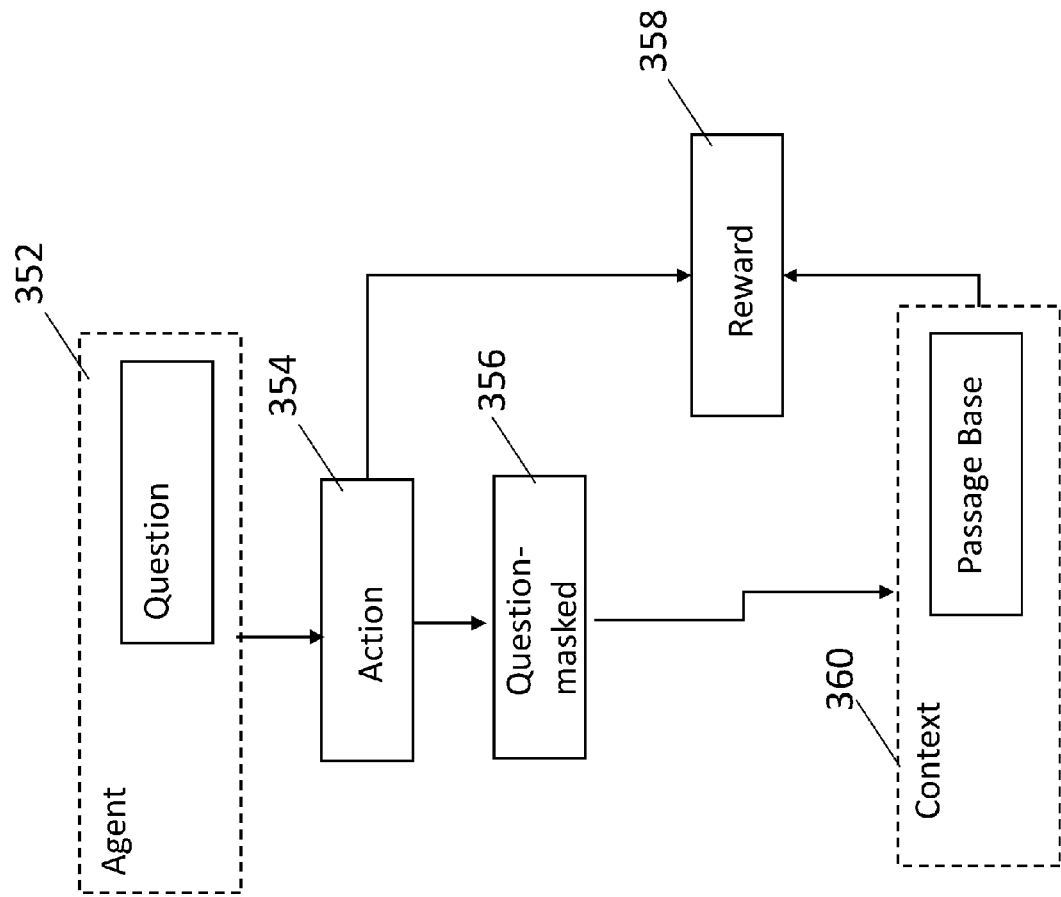
FIG. 5 depicts an example of a flow diagram of a reinforcement learning system for predicting the missing key information that may appear in a question from which a training dataset is constructed, in accordance with embodiments of the present invention.
Figure 5:
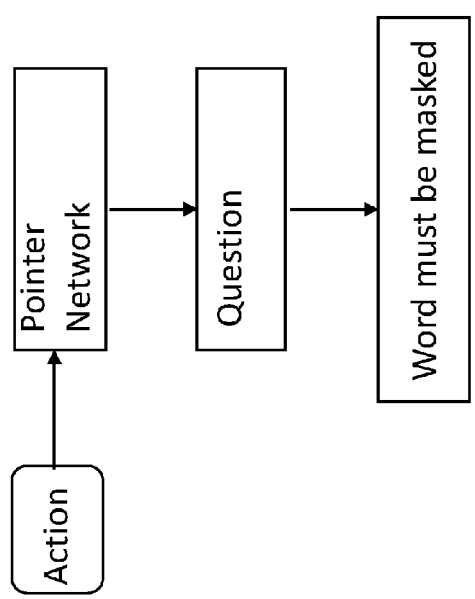

FIG. 5 depicts an example of a flow diagram of a reinforcement learning system for predicting the missing key information that may appear in a question from which a training dataset is constructed, in accordance with embodiments of the present invention. This example may be performed by step 106 of FIG. 1 and/or step 204 in FIG. 2. In some embodiments, after the training dataset in constructed as described with reference to FIG. 4, one or more reinforcement learning algorithms can be executed to predict the missing information that may appear in the question. Accordingly, reference is made to FIG. 4 in describing features of FIG. 5.

The question of interest is used as an agent (352) in the reinforcement learning system. An action (354) is performed by the reinforcement learning system. The action includes the act of masking (356) the words in the question and applying a reward (358) described in FIG. 4. The action (354) may be referred to as an action model that is used for the reinforcement learning system. The passage is used as the context in the reinforcement learning system. The reinforcement learning system in turn trains the model to select one or more words that appear in the question. If the words are not in the passage (360), an inaccurate reading comprehension process may be performed. On the other hand, if the words are in the passage, the reading comprehension algorithm may locate the answer with accuracy. These words appearing in the question may correspond to missing key information that appear in the question sentences, for example, shown in the example in FIG. 2. The reinforcement learning system provides a model for enumerating all possible missing information.

Figure 6:
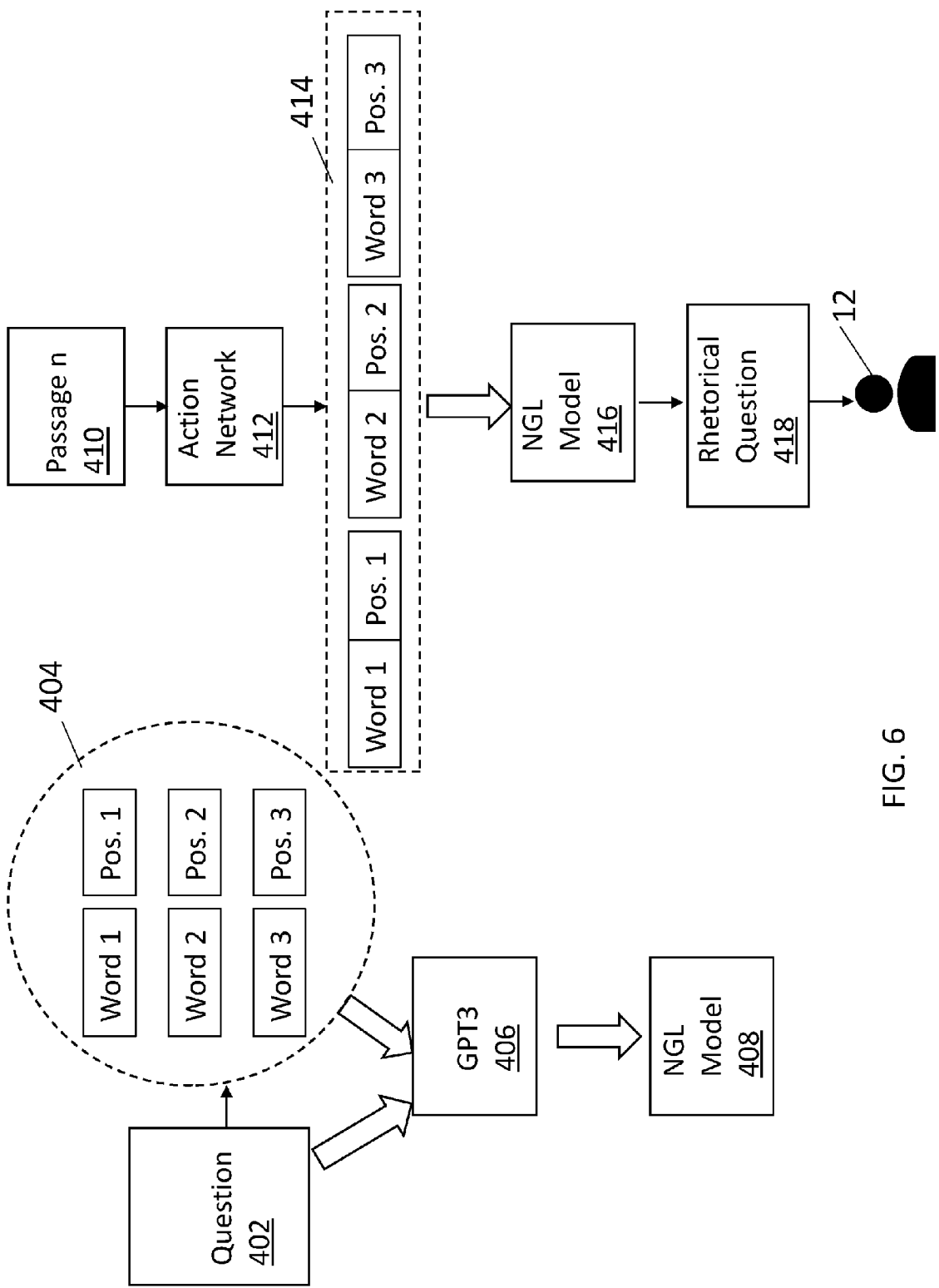
FIG. 6 depicts an example of a training model applied to select keywords about which a rhetorical question is generated, in accordance with embodiments of the present invention.

FIG. 6 depicts an example of a training model applied to select keywords about which a rhetorical question is generated, in accordance with embodiments of the present invention.

As described above with respect to FIG. 1, step 108, an action model (412) is trained by a reinforcement learning algorithm to select keywords of interest from a stored passage (410) as possible missing information for generating clarifying questions (402) based on the selected missing information through a NLG method and send the question to the user.

For the natural language generation (NLG) model, the question (402) is segmented (404) and part of speech is extracted to form a two-tuple of "word+part of speech". In some embodiments, only words having nouns and verbs as parts of speech are selected.

The NLG model (408) is trained, for example, by a GPT3 model (406) or the like. The training data may include a binary group of nouns and verbs selected from the question, for example, described in step 106. The question itself can be used as labeled training data. Here, certain keywords are input. A rhetorical question (418) is generated that is centered around these keywords (414). After the NLG model is trained, the missing information and part of speech are used as input (414), and the NLG model (416) generates a rhetorical question (418). The generated clarifying question (s) is output to the computer 14 of the questioner 12.

Figure 7:
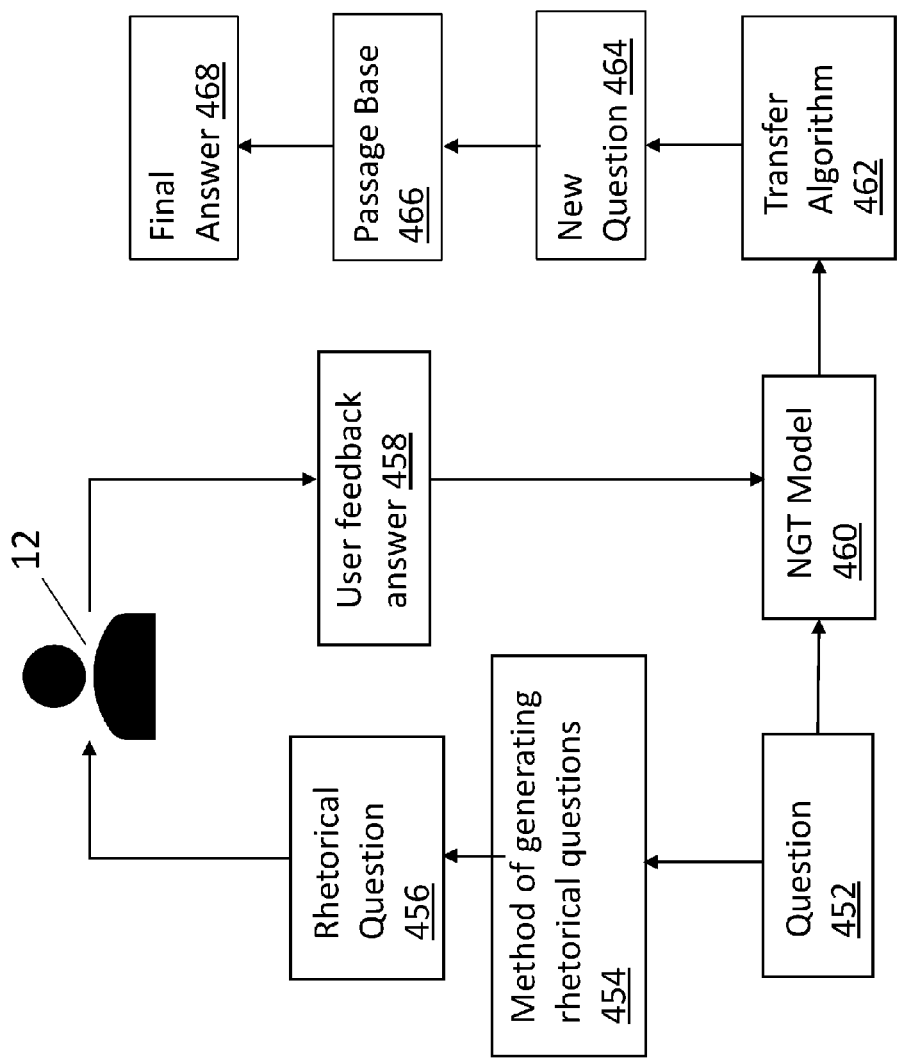
FIG. 7 depicts an example of a QA system generating new questions for missing information for arriving at a final answer, in accordance with embodiments of the present invention.

FIG. 7 depicts an example of a QA system for generating new questions for missing information for arriving at a final answer, in accordance with embodiments of the present invention.

As shown and described in FIG. 6, a GPT3 model can be used to generate rhetorical questions for key information to feed back to the user 12. When the user responds (458) to the feedback question, the user's feedback answer (458) is combined with the original question (452) as inputs to the NLG model (460). A text style transfer (TST) algorithm (462) and NLG model (460) can generate new questions and act on the document library so that the QA system can generate an accurate answer. In some embodiments, the TST algorithm may be part of an NLG system that changes the stylistic properties of the text while retaining its style-independent content. For example, a TST algorithm may process the corpus in a knowledge base, which includes multiple sentences with different styles but same semantics. When generating new questions that are compatible with a predetermined machine reading comprehension model, the style of the new questions is preserved to be consistent with the style of the questions in the reading comprehension dataset, e.g., SQuAD. Here, the text style transfer algorithm (462) uses a transform-based technology, and the NLG algorithm (460) uses the GPT3-based model, not limited thereto, to process the questions (452) so that the QA system can generate a final answer (468). Accordingly, the QA system may include a language processing system that includes at least one processor and memory (for example, described in FIG. 8), that store and process data for executing both an NLG technique based on GPT-3 or the like and a natural language style transfer technique, e.g., a TST algorithm.

Figure 8:
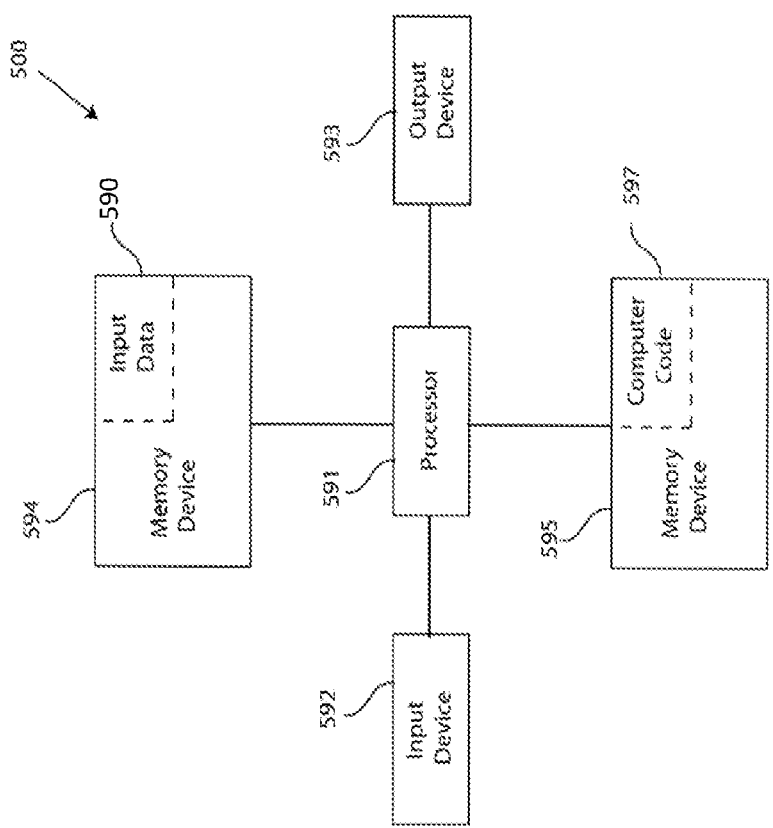
FIG. 8 illustrates a computer system used by the QA system of FIG. 2 and that implements the method of FIG. 1 and example processes of FIGS. 3-7, in accordance with embodiments of the present invention.

FIG. 8 illustrates a computer system 500 used by or comprised by the system and method of FIGS. 1-7 for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
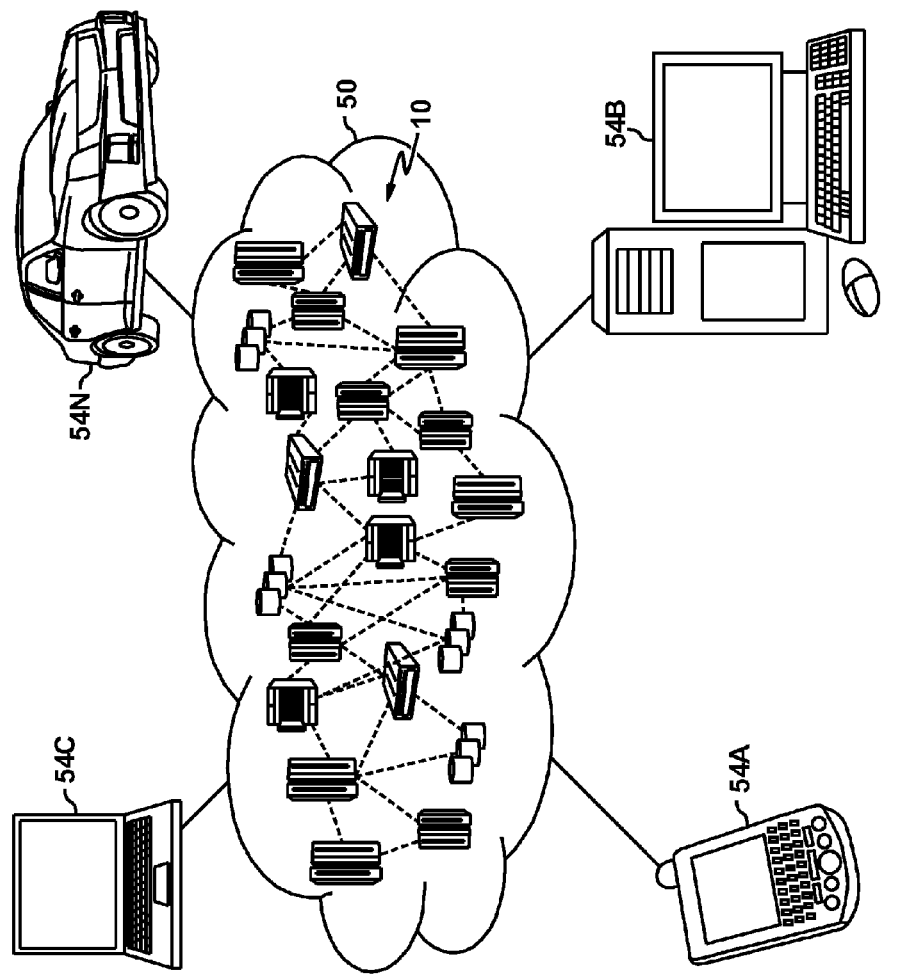
FIG. 9 illustrates a cloud computing environment, in accordance with embodiments of the present invention.

The computer system 500 illustrated in FIG. 9 includes a processor 591, an input device 592 coupled to the processor 591, an output device 593 coupled to the processor 591, and memory devices 594 and 595 each coupled to the processor 591. The input device 592 may be, inter alia, a keyboard, a mouse, a camera, a touchscreen, etc. The output device 593 may be, inter alia, a printer, a plotter, a computer screen, a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 595 includes a computer code 597. The computer code 597 includes algorithms (e.g., the algorithms of FIGS. 1 and 3-7) for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled. The processor 591 executes the computer code 597. The memory device 594 includes input data 596. The input data 596 includes input required by the computer code 597. The output device 593 displays output from the computer code 597. Either or both memory devices 594 and 595 (or one or more additional memory devices Such as read only memory device 596) may include algorithms (e.g., the algorithms of FIGS. 1 and 3-7) and may be used as a computer usable medium (or a computer readable medium or a program storage device) having a computer readable program code embodied therein and/or having other data stored therein, wherein the computer readable program code includes the computer code 597. Generally, a computer program product (or, alternatively, an article of manufacture) of the computer system 590 may include the computer usable medium (or the program storage device).

In some embodiments, rather than being stored and accessed from a hard drive, optical disc or other writeable, rewriteable, or removable hardware memory device 595, stored computer program code 597 (e.g., including algorithms) may be stored on a static, nonremovable, read-only storage medium such as a Read-Only Memory (ROM) device, or may be accessed by processor 591 directly from such a static, nonremovable, read-only medium. Similarly, in some embodiments, stored computer program code 597 may be stored as computer-readable firmware, or may be accessed by processor 591 directly from such firmware, rather than from a more dynamic or removable hardware data-storage device 595, such as a hard drive or optical disc.

Still yet, any of the components of the present invention could be created, integrated, hosted, maintained, deployed, managed, serviced, etc. by a service supplier who offers to improve software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled. Thus, the present invention discloses a process for deploying, creating, integrating, hosting, maintaining, and/or integrating computing infrastructure, including integrating computer-readable code into the computer system 500, wherein the code in combination with the computer system 500 is capable of performing a method for enabling a process for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled. In another embodiment, the invention provides a business method that performs the process steps of the invention on a subscription, advertising, and/or fee basis. That is, a service supplier, such as a Solution Integrator, could offer to enable a process for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 500 as a particular configuration of hardware and software, any configuration of hardware and software, as would be known to a person of ordinary skill in the art, may be utilized for the purposes stated supra in conjunction with the particular computer system 500 of FIG. 8. For example, the memory devices 594 and 595 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

Figure 10:
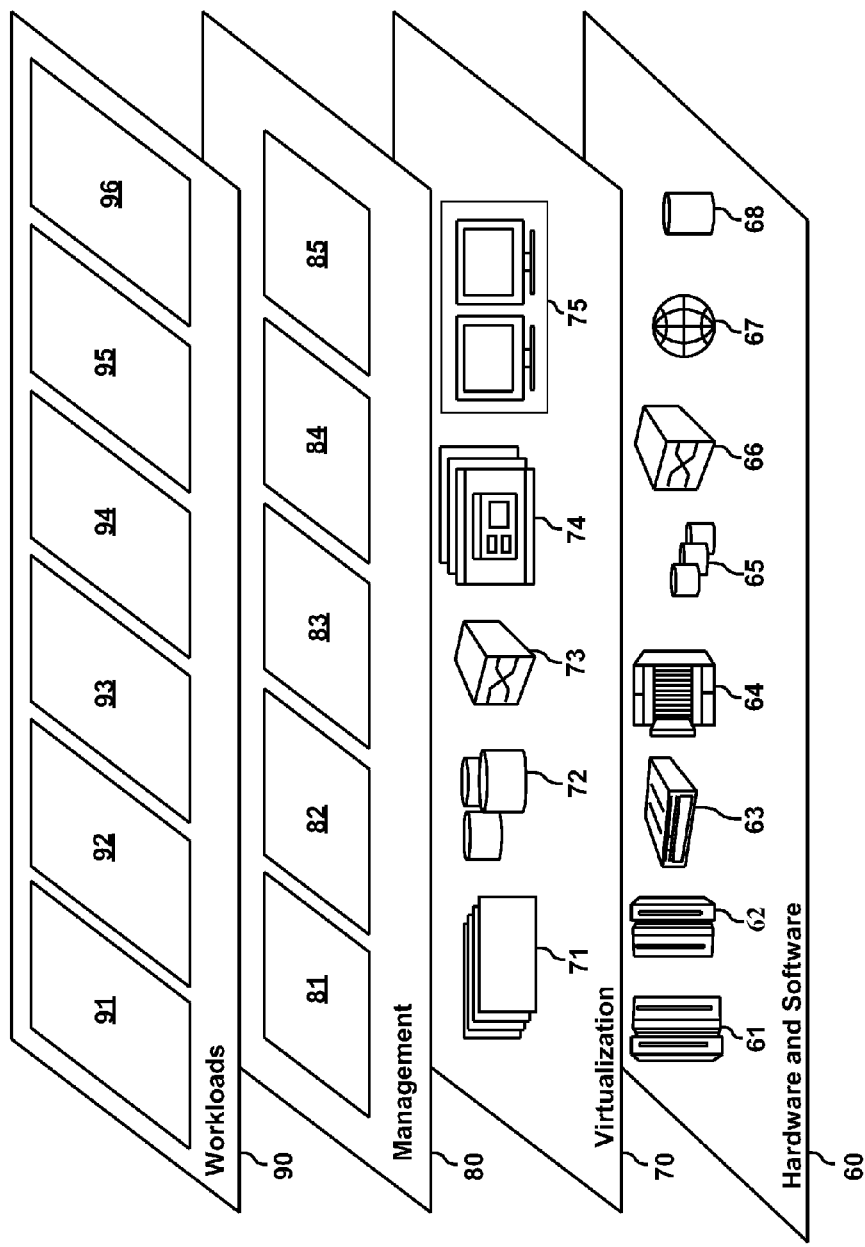
FIG. 10 illustrates a set of functional abstraction layers provided by cloud computing environment, in accordance with embodiments of the present invention.

Referring now to FIG. 10, a set of functional abstraction layers provided by cloud computing environment 50 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving software and memory system technology associated with utilizing hardware and software resources within a hybrid cloud environment and enabling a non-volatile memory host system and an associated target system for operational functionality; connecting the non-volatile memory host system to an I/O queueing component and generating queue structures with respect to a host driver component; and enabling the queue structures and a generated special purpose cache structure such that remote data mirroring functionality is enabled 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising:
a central processing unit (CPU);
a memory coupled to the CPU; and
one or more computer readable storage media coupled to the CPU, the one or more computer readable storage media collectively containing instructions that are executed by the CPU via the memory to cause the processor to implement a question answering system process, comprising:
constructing, by the processor, a training set to detect missing information of a question received by the processor, the question semantically related to a source of information in a document library;
identifying a plurality of components of the question, the components including information terms of the question;
generating a plurality of masked questions from the question, including, for each of the masked questions, masking one component of the plurality of components of the question at a time until each of the plurality of components is masked to generate the masked question;
applying a reading comprehension algorithm to the each masked question to generate new training data;
generating the new training data from a combination of the source of information, the masked component, the question, and an answer assessment generated from a comparison of the source of information and the component of the question that is masked;
receiving, by a reinforcement learning (RL) system, the new training data to predict the missing information of the question;
training, by the processor, a natural language generation model using the missing information, including, in response to the generating the answer assessment, selecting words about which another question is generated for clarifying the question;
executing, by the processor, the natural language generation model to generate the other question clarifying the question using the selected words;
combining, by the processor, a response to the other question and the question to generate an input to a language processor;
generating, by the language processor, a new question;
applying the new question to a document library; and
generating a final answer.

2. The computer system of claim 1, wherein constructing the training set includes the computer executing the reading comprehension dataset to according to the reinforcement learning (RL) system to predict the missing information in the question.

3. The computer system of claim 2, wherein the training set includes a Stanford Question Answering Dataset (SQUAD)-type comprehension dataset, and wherein a new dataset is constructed from the SQUAD-type comprehension dataset.

4. The computer system of claim 3, wherein the new dataset is further generated according to a reinforcement learning model to detect the missing information.

5. The computer system of claim 1, wherein the language processor includes executes combination of a Generative Pre-trained Transformer (GPT)-3 model and a text style transfer (TST) algorithm to generate the new question.

6. The computer system of claim 5, wherein the combination of the GPT-3 model and the TST algorithm are performed on contents of the document library.

7. The computer system of claim 1, wherein the document library is part of a knowledge base.

8. The computer system of claim 1, wherein constructing the training set includes:
  applying, by the processor, a data mask to the each component of the question to cover or redact the information terms of the question;
  applying, by the processor, the reading comprehension algorithm to the question with the covered or information terms; and
  searching, by the processor, for information in the document library semantically related to the original question to generate the new training data.

9. The computer system of claim 8, wherein the new training data is generated by a predetermined set of rules establishing a reward score of the answer assessment established by conditions for masking the terms, so that that the new training data includes a combination of the masked word, the question, the reward, the information, and the answer, and wherein the new training data is applied to a reinforcement learning technique of the RL system.

10. A feedback-type question answering method, comprising:
  receiving, by a data processing system, a question from a user, the data processing system comprising at least one processor and at least one memory, the at least one memory comprising instructions which are executed by the at least one processor;
  constructing, by the at least one processor, a training set to detect missing information of the question received by the at least one processor, the question semantically related to a source of information in a document library;
  identifying a plurality of components of the question, the components including information terms of the question;
  generating a plurality of masked questions from the question, including, for each of the masked questions, masking one component of the plurality of components of the question at a time until each of the plurality of components is masked to generate the masked question;
  applying a reading comprehension algorithm to the each masked question to generate new training data;
  generating the new training data from a combination of the source of information, the masked component, the question, and an answer assessment generated from a comparison of the source of information and the component of the question that is masked;
  receiving, by a reinforcement learning (RL) system, the new training data to predict the missing information of the question;
  training, by the at least one processor, a natural language generation model using the missing information, including, in response to the generating the answer assessment, selecting words about which another question is generated for clarifying the question;
  executing, by the at least one processor, the natural language generation model to generate the other question clarifying the question using the selected words;
  combining, by the at least one processor, a response to the other question and the question to generate an input to a language processor;
  generating, by the language processor, a new question; applying the new question to a document library; and generating a final answer.

11. The feedback-type question answering method of claim 10, wherein constructing the training set includes executing the reading comprehension dataset to according to the reinforcement learning (RL) system to predict the missing information in the question.

12. The feedback-type question answering method of claim 11, wherein the training set includes a Stanford Question Answering Dataset (SQUAD)-type comprehension dataset, and wherein a new dataset is constructed from the SQUAD-type comprehension dataset.

13. The feedback-type question answering method of claim 12, wherein the new dataset is further generated according to a reinforcement learning model to detect the missing information.

14. The feedback-type question answering method of claim 10, wherein the language processor includes executes a Generative Pre-trained Transformer (GPT)-3 model and a text style transfer (TST) algorithm to generate the new question.

15. The feedback-type question answering method of claim 14, wherein the GPT-3 model and the TST algorithm are performed on contents of the document library.

16. The feedback-type question answering method of claim 10, wherein the document library is part of a knowledge base.

17. The feedback-type question answering method of claim 10, wherein constructing the data set includes:
  applying a data mask to the each component of the question to cover or redact the information terms of the question;
  applying the reading comprehension algorithm to the question with the covered or information terms; and
  searching for information in the document library semantically related to the original question to generate the new training data.

18. The feedback-type question answering method of claim 17, wherein the new training data is generated by a predetermined set of rules establishing a reward score established by conditions for masking the terms, so that that the new training data includes a combination of the masked word, the question, the reward, the information, and the answer, and wherein the new training data is applied to a reinforcement learning technique of the RL system.

19. A computer program product for optimizing a feedback-type question answering process, the computer program product comprising:
  one or more non-transitory computer readable storage media having computer readable program code collectively stored on the one or more computer readable storage media, the computer readable program code being executed by a central processing unit (CPU) of a computer system to cause the computer system to perform a method, said method comprising:
  receiving, by the computer system, a question from a user, the data processing system comprising at least one processor and at least one memory;
  constructing, by the computer system, a training set to detect missing information of the question received by the at least one processor, the question semantically related to a source of information in a document library;
  identifying a plurality of components of the question, the components including information terms of the question;
  generating a plurality of masked questions from the question, including, for each of the masked questions, masking one component of the plurality of components of the question at a time until each of the plurality of components is masked to generate the masked question;

applying a reading comprehension algorithm to the each masked question to generate new training data;

generating the new training data from a combination of the source of information, the masked component, the question, and an answer assessment generated from a comparison of the source of information and the component of the question that is masked;

receiving, by a reinforcement learning (RL) system, the new training data to predict the missing information of the question;

training, by the computer system, a natural language generation model using the missing information, including selecting words about which another question is generated for clarifying the question, including, in response to the generating the answer assessment, selecting words about which another question is generated for clarifying the question;

executing, by the computer system, the natural language generation model to generate, including selecting words about which another question is generated for clarifying the question using the selected words;

combining, by the computer system, a response to the other question and the question to generate an input;

generating, by the computer system, a new question;

applying, by the computer system, the new question to a document library; and generating, by the computer system, a final answer.

20. The computer program product of claim 19, wherein constructing the training set includes:

applying a data mask to the each component of the question to cover or redact information terms of the question;

applying the reading comprehension algorithm to the question with the covered or information terms; and searching for information in the document library semantically related to the original question to generate new training data.

\* \* \* \* \*